May 29, 1934.   T. J. KIDD   1,960,497
COTTON SEED CLEANER
Filed March 18, 1932   2 Sheets-Sheet 1
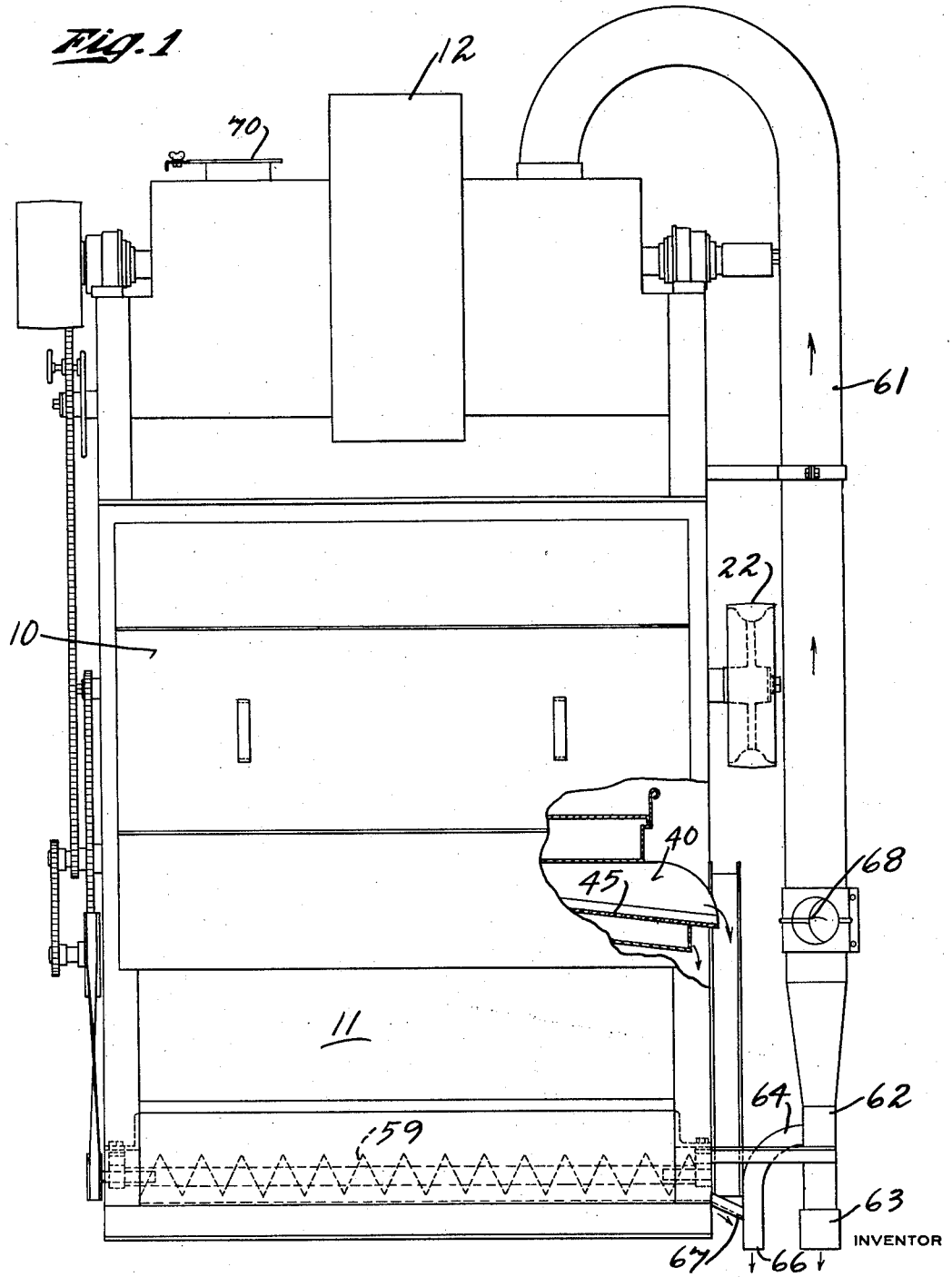
INVENTOR
Thomas J. Kidd
BY
Johnston & Jennings
ATTORNEYS

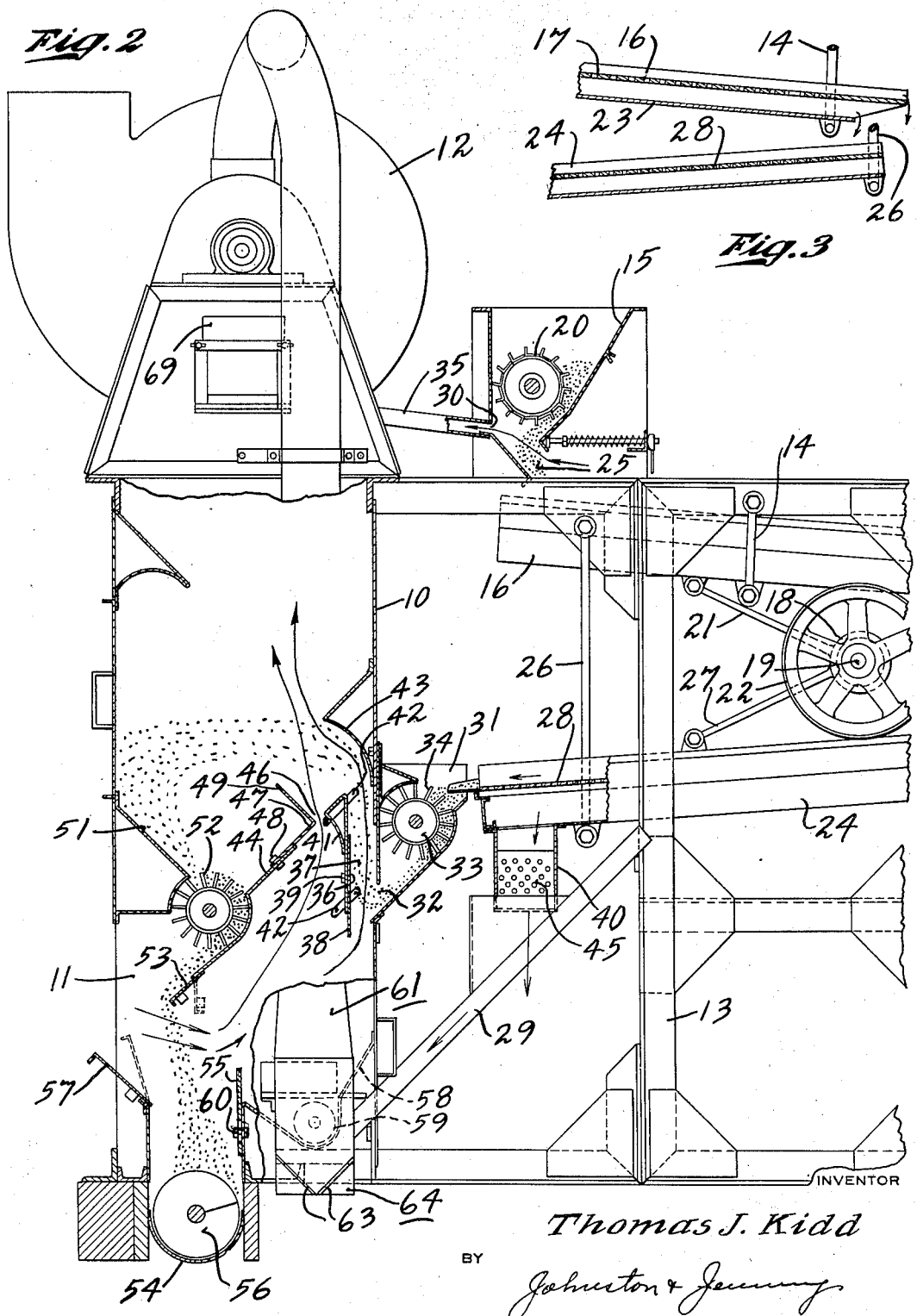

Patented May 29, 1934

1,960,497

UNITED STATES PATENT OFFICE 1,960,497

COTTON SEED CLEANER

Thomas J. Kidd, Birmingham, Ala., assignor to The Bauer Brothers Company, a corporation of Ohio Application March 18, 1932, Serial No. 599,812

6 Claims. (Cl. 209—133)

My invention relates to a method and apparatus for cleaning material such as cotton seed and removing therefrom all foreign matter such as trash, sand, stones, metal and other substances preparatory to further processing of the seeds such as delinting, grinding and pressing.

One object of my invention is to provide a method and apparatus for cleaning cotton seed which shall be effective to separate foreign matter which is heavier as well as that which is lighter from the seed.

A further object of my invention is to provide apparatus for the cleaning of cotton seed in which the seed are caused to travel in a continuous stream and in which they are subjected successively while in suspension to a plurality of separate air currents, transverse to the stream of cotton seed.

A still further object of my invention is to provide apparatus for cleaning cotton seed which shall include means for successive mechanical and pneumatic separation of foreign matter from the seed.

Cotton seed, as they come from a gin, contain a considerable portion of foreign materials which are both heavier and lighter than the cotton seed. Examples of the heavier material are sand, small stones, and metal pieces which are picked up in handling by the seed cotton before ginning and which are delivered from the gin with the seed. The lighter materials with the cotton seed consists largely of pieces of cotton bolls, leaves, straw, and various kinds of trash which adhere to the lint of the cotton before ginning. It is the usual practice in handling cotton seed after ginning to run them through delinting machines which remove the major portion of the lint left on by the gins, after which operation they are broken to remove the meats from the hulls. The hulls are separated from the meats and the meats are subjected to a cooking and pressing operation to remove the oil therefrom.

The presence of these foreign substances are highly objectionable as being injurious to the delinter machines and render the fiber dirty and undesirable. The heavier foreign material is objectionable in the processing of the seeds where the hulls and meat are separated and the oil is separated from the meat.

In addition to materials foreign to the cotton seed, there are always found in cotton seed a small percentage of what are known as "black seed", which are cotton seed which have no lint on them whatever, the meats being enclosed solely by smooth black hulls. It is desirable before the seed are passed to the delinters that the black seed be separated from those bearing lint.

In accordance with my invention, I provide a method and apparatus whereby black seed and all of the various foreign substances are removed from the bulk of cotton seed before they are further processed. This is brought about by a succession of operations including both a mechanical separation and a separation by air currents while the seed are in suspension.

Briefly, my invention consists in a series of oppositely inclined shaking screens over which the seed pass, together with means for subjecting the seed being fed on to the screen to a stream of air for removing therefrom light material, such as dust and fluff, before passing to the screens. The screens remove the larger particles of trash such as bolls, leaves, etc., and also the smaller heavier particles, such as loose meats, sand, etc.

From the inclined screens the seed are fed through an air sealed feed means into an enclosed casing provided at its top with an exhaust fan. The seed are first introduced in the casing into a vertical passage through which an air current passes which is of sufficient velocity to raise the seed having lint thereon, but which permits the heavier black seed, pieces of stone and metal, to drop to the bottom where they fall into a conveyer which removes them from the casing. After leaving the vertical passage, the partially cleaned seed are directed by a baffle across the casing and in crossing the casing are again subjected to an air current passing upwardly to the exhaust fan and which removes other light foreign substances from the seed. The seed then falls into a hopper having an air sealed delivery means located in the bottom and are delivered by the said delivery means in a wide stream to the bottom of the casing from whence they are removed from the casing. As the seed fall from this delivery means, the air currents entering the casing for the cleaning of the seed pass through the falling stream of seed and remove all remaining foreign substances from them. This latter current may be adjusted so as to remove all straw and heavy trash which might have escaped the earlier cleaning operation, from whence it passes into the delivery means for the black seed, stones and metal.

The black seed, stones, and metal, upon removal from the casing, are subjected to a further treatment with the air current, which serves to separate the stones and metal from the black seed whereby the latter may be utilized for further processing.

Apparatus embodying features of my invention is illustrated in the accompanying drawings forming a part of this application, wherein Figure 1 is a rear view in elevation of my improved apparatus with parts broken away to show the preliminary separation of some of the foreign substances;

Figure 2 is a side view partly in section and partly in elevation, showing the interior of the casing wherein the pneumatic separation is effected, together with the shaking screens, and Figure 3 is a fragmentary view drawn to a smaller scale showing the outer ends of the shaking screens.

Referring now to the drawings for a better understanding of my invention, I show a casing 10 having an air inlet 11 in the lower portion thereof. On top of the casing 10 is an exhaust fan 12 which draws air in through the inlet 11 and removes it outwardly and upwardly through the casing, together with shale and light trash removed from the cotton seed under treatment as hereafter described.

Joined to the casing 10 at the front thereof is a frame 13. Supported from the frame 13 by hangers 14 is an upper inclined screen frame 16. The screen frame 16 is provided with a screen 17 of relatively coarse mesh which permits the seed to pass therethrough but which does not permit larger particles such as pieces of bolls, large leaves, etc. The screen frame 16 is oscillated by means of an eccentric 18 mounted on a shaft 19 and an eccentric rod 21 connected by any suitable means to the lower part of the screen frame 16. The shaft 19 is driven through a pulley 22 from any suitable source of power not shown.

The bottom of the screen frame 16 is provided with a plate 23 and as the frame is oscillated the seed fall on the plate 23 and are carried downwardly to the outer end of the screen frame while the larger particles of foreign substances removed are carried on the screen and delivered over the outer end thereof as waste.

The seed are first fed to the apparatus through a primary feed hopper 15 located above the screen frame 16 and provided with a rotary feeder 20. The lower rear side of the hopper 15 is provided with an opening 25, while the front side is provided with an opening 30 connected to a conduit 35 leading to the intake side of the exhaust fan 12, whereby the seed falling on to the screen 17 are subjected to a cross current of air which removes a portion of the light foreign material from the seed.

Positioned below the screen frame 16 is a second screen frame 24 supported by hangers 26 and oscillated from the eccentric through an eccentric rod 27 similar to the manner in which the upper screen is oscillated. The screen frame 24 is provided with a finer screen 28 on which the seed remain but which permits smaller particles such as loose meats, sand, chaff, etc., to be removed. The loose meats, chaff, etc., which pass through the screen fall into a transverse inclined trough 40 provided with a screen 45 which permits the sand to fall through and go to waste. The loose meats travel over the screen 45 and fall into an inclined chute 29 from whence they are delivered to an apparatus for further treatment to be described later.

After passing over the inclined screen 28, the partially cleaned seeds pass into a hopper 31 opening at 32 into the casing 10. The hopper 31 is provided with a rotary feeding wheel 33 provided with soft rubber brushes 34 which form an air seal against the passage of air into the casing through the hopper 31.

Positioned within the casing 10 directly in front of the opening 32 is a baffle 36 which forms with the wall of the casing a vertically extending passage 37 into which the seed pass. The baffle 36 is provided with a plate 38 adjustably connected to the baffle by means of bolts 39 whereby the length of the passage 37 may be varied. The upper inner side of the baffle 36 is provided with an inwardly curved portion 41 whereby to divert air currents passing in front of the baffle rearwardly of the casing. The baffle 36 is mounted at its ends in inclined slots 42 in the end plates of the casing 10 whereby it may be moved to narrow or widen the passage 37.

At the upper end of the passage 37 is positioned a baffle member 43 which is curved inwardly and rearwardly whereby to divert cotton seed passing upwardly through the passage 37 across to the rear of the casing 10. Extending from the lower forward part of the casing 10 is a baffle 44 forming with the baffle 36 a second air passage 46 through which the air passes upwardly substantially parallel to the passage 37. On the upper end of the baffle 44 is a plate 47 adjustably secured to the baffle 44 by means of bolts 48 whereby the width of the passage 46 may be varied and the amount of air passing through said passage accordingly varied. The upper end of the plate 47 is bent rearwardly at right angles to form a rearwardly extending portion 49, which provides a better control for the upwardly expanding air stream.

Extending forwardly from the rear of the casing 10 is a downwardly inclined plate 51 which, with the baffle plate 44, forms a hopper into which the cleaned seed fall. Positioned in the lower end of this hopper is a rotary delivery roller 52 similar in construction to the roller 33 already described, and which provides an air sealed delivery means for the cleaned seed.

The lower end of the baffle plate 44 provides an apron over which the cleaned seed are directed toward the air inlet 11 and are caused to fall downwardly in front of this air inlet where the air currents entering the casing cross the falling seed and remove any remaining trash from them. Adjustably secured to the lower end of the baffle plate 44 is an apron 53 which may be positioned to vary the trajectory of the falling seed.

After passing in front of the air inlet, the seed fall into a conveyer trough 54 in which is located a screw conveyer 56 and which removes the seed from the casing. The velocity and in part the volume of air passing through the inlet 11 may be varied by means of an adjustable gate 57 positioned in front of the air inlet, as well as by the positioning of the apron 53 with respect to said gate. At the front of the conveyer trough 54 is a vertical transverse plate 55, which is vertically adjustable by means of bolts 60. The adjustment of the plate 55 varies the amount of heavy trash that may be removed by the entering air currents.

The amount of air passing through the air inlet 11 and the size of the passage 37 is so adjusted that the current of air passing through said passage is strong enough to raise the cotton seed having lint adhering thereto but which permits the black seed, small stones, and pieces of metal to drop downwardly. Upon dropping downwardly the black seed, particles of stone and metal are caught in a conveyer trough 58 having a screw conveyer 59 located therein and which removes the black seeds, stones and metal from the casing.

Located at one end of the casing 10 is an upwardly extending air conduit 61 which is connected to the exhaust fan 12 and through which a stream of air is drawn upwardly into the fan. The bottom of the conduit 61 is narrowed in cross section at 62 and is provided at the bottom with rubber or fabric flaps 63. The action of the air current ordinarily holds these flaps closed.

Connected to the restricted portion 62 of the conduit 61 is an elbow connection 64 which terminates in a downwardly extending open end 66. The conveyer 59 and the downwardly inclined trough 29, heretofore described, both deliver their product through a short downwardly extending trough 67 into the downwardly extending portion of the elbow 64. There the product meets the upwardly flowing air current which is strong enough to lift the trash, black seed, and loose meats, but which does not lift the stone, metal, and other heavier foreign material, which falls out of the lower end of the elbow connection and goes to waste.

The black seed and loose meats, upon being drawn into the enlarged portion of the conduit 62 where the air velocity is less, fall into the lower end of the conduit below the elbow connection, and when accumulated in sufficient quantity for their weight to overcome the force of the air current holding the flaps 63 closed, cause the flaps to open and allow the black seeds to fall down where they may be recovered for further treatment.

The amount of air passing into the conduit 61 may be regulated by means of an adjustable damper 68. In addition to this means for varying the amount of air passing through the exhaust fan 12, I provide dampers 69 and 70 in the fan casing, through which secondary air may be admitted and lessen the volume of air passing through the casing 10.

Having thus described the construction of my apparatus, the operation thereof is as follows:

The cotton seed, as they come from the gin, are fed into the hopper 15 and from thence pass by the rotary feeder 20 to fall upon the upper screen 17, and in falling on the screen are subjected to a transverse air current passing through the conduit 35 to the exhaust fan 12, removing a part of the loose dust and fluff from the seed.

The shaking screen 17 is coarse enough to allow the seed to pass through, but the larger trash, such as pieces of bolls, et cetera, remain on the screen and fall to waste over the outer end thereof. The seed passing through the screen 17 fall off the plate 23 and from thence onto the outer end of the screen 28, which is inclined in the opposite direction and which carries the seed back toward the feed hopper 31. The screen 28, being of sufficiently fine mesh that the seed do not pass through, removes the loose meats, sand, and small chaff, from the seed, and such foreign material falls into the trough 40 where the sand is separated. The loose meats fall into the downwardly inclined trough 29.

Upon passing into the feed hopper 31, the partially cleaned seed are carried by the air sealed feeder 33 to the interior of the casing into the passage 37 where they are subjected to the upwardly flowing air current from the inlet 11. The air current and the width of the passage 37 are so adjusted as to raise the lint bearing seed upwardly into the upper part of the casing, while the black seed, stones, and metal fall downwardly to the lower part of the casing into the conveyer trough 58, from which they are removed by the conveyer 59.

The seed passing upwardly in the casing are diverted by the curved baffle 43 across the casing where they are subjected to a transverse flow of air through the passage 46, further removing light trash and foreign material from the seed. The cleaned seed then fall into the hopper defined by the plates 51 and 44, and are removed therefrom by the rotary air sealed feeder 52. From the feeder 52 the cleaned seed cascade in front of the air inlet 11 where they are subjected to a further cleaning from the incoming air crossing the falling seed. The cleaned lint bearing seed are then removed from the apparatus where they are ready for further processing.

The gate 57, the lower end 53 of the baffle 44 and the plate 55 are so adjusted that the entering air through the inlet 11 takes out all foreign material that was carried upwardly through the passage 37 and which was too heavy to be carried out by the exhaust fan 12. This material is blown over the plate 55 into the trough 58, from which it is removed by the conveyer 59.

The black seed mixed with the pieces of stone, metal, et cetera, pass into the lower end of the elbow connection 64 from which the black seed are lifted into the conduit 61 as heretofore described, and the stones, metal, and heavier particles fall out of the lower end 66 of the elbow connection 64. The black seed, upon entering the conduit 61 and being subjected to the lower velocity air current, drop into the lower end thereof and periodically force the flaps 63 to open and let the black seed fall outwardly where they may be recovered.

While I have shown my invention in but one form, it will be obvious to those skilled in the art that it is not so limited, but is susceptible of various changes and modification, without departing from the spirit thereof, and I desire, therefore, that only such limitations shall be placed thereupon as are imposed by the prior art or as are specifically set forth in the appended claims.

What I claim is:

1. A cleaning apparatus comprising a casing, air sealed means for feeding material to be cleaned into one side of the casing, baffle means forming a vertical passage adjacent the feed, other baffle means forming a second passage parallel to the first mentioned passage, air inlet means on the opposite side of the casing for supplying both passages, a fan for effecting a flow of air through the passages of sufficient force to raise the material being cleaned up through the first mentioned passage and remove lighter foreign material therefrom, while permitting heavier foreign material to fall downwardly through the passage, a curved baffle for directing the material to be cleaned across the casing toward the opposite side thereof over the second passage, air sealed delivery means for the cleaned material disposed at the rear of the second passage, and means for directing the material from the delivery means to fall in front of the air inlet means.

2. In a cleaner of the character described, a casing, air sealed feed means for cotton seed on the front of the casing, an exhaust fan in the top of the casing, air inlet means for outside air extending across the rear of the casing opposite the feed means, means defining an air passage in the casing adjacent the feed through which seeds being cleaned are raised by the air current, a hopper in the casing to the rear of the passage, and air sealed means for discharging seeds from the hopper across the casing in front of the air inlet means.

3. In a cleaner of the character described, a casing, air sealed feed means for cotton seed on the front of the casing, an exhaust fan in the top of the casing, air inlet means for outside air extending across the rear of the casing opposite the feed means, means defining an air passage in the casing adjacent the feed through which seeds being cleaned are raised by the air current, means for varying the width of said passage, means defining an air passage to the rear of said first mentioned passage, means for deflecting seeds across the rear passage from the front passage, a hopper extending across the casing to the rear of the rear passage, and air sealed means for discharging seeds in a cataract from said hopper in front of the air inlet.

4. In a cleaner of the character described, a casing, air sealed feed means for cotton seed on the front of the casing, an exhaust fan in the top of the casing, air inlet means for outside air extending across the rear of the casing opposite the feed means, means defining an air passage in the casing adjacent the feed through which seeds being cleaned are raised by the air current, means for varying the width of said passage, means defining an air passage to the rear of said first mentioned passage, means for deflecting seeds across the rear passage from the front passage, a hopper extending across the casing to the rear of the rear passage, air sealed means for discharging seeds in a cataract from said hopper in front of the air inlet, means for varying the trajectory of the seeds falling in front of the air inlet, and means for varying the volume and velocity of air flowing through the falling seeds.

5. In a cotton seed cleaning apparatus, a casing, an exhaust fan in the top of the casing, air inlet means across the rear of the casing in the lower portion thereof, means for feeding seeds to be cleaned across the front of the casing, means for subjecting the seeds being fed to a cross current air blast created by the fan before entering the casing, means defining an air passage across the casing to the rear of the feeding means through which the seeds being cleaned are raised upwardly in the casing and lighter trash removed therefrom, means above the passage for deflecting the seeds across the casing, a hopper extending across the casing to the rear thereof for receiving the deflected seeds, and air sealed delivery means in the bottom of the hopper to cascade the seeds from the hopper in front of the air inlet means.

6. The method of separating relatively heavy foreign matter such as stones, and relatively light foreign matter such as pieces of cotton hulls, from cotton seed, which comprises subjecting a downwardly flowing stream of seeds to be cleaned to an ascending current of air of sufficient velocity to carry the cotton seeds and light foreign matter upwardly and to permit the heavier foreign matter to descend, then subjecting the stream of cotton seeds and light foreign matter to a current of air flowing transversely to the flow of the stream to remove a part of the light foreign material therefrom, collecting the partially cleaned seeds, feeding the seeds downwardly in an even stream, and subjecting said downwardly flowing stream to a cross current of air to remove the remaining particles of relatively light foreign material therefrom.

THOMAS J. KIDD.